Jan. 4, 1966  R. A. STUBBLEFIELD  3,227,489
RETRACTABLE SEAT BELT
Filed Aug. 21, 1963  3 Sheets-Sheet 1
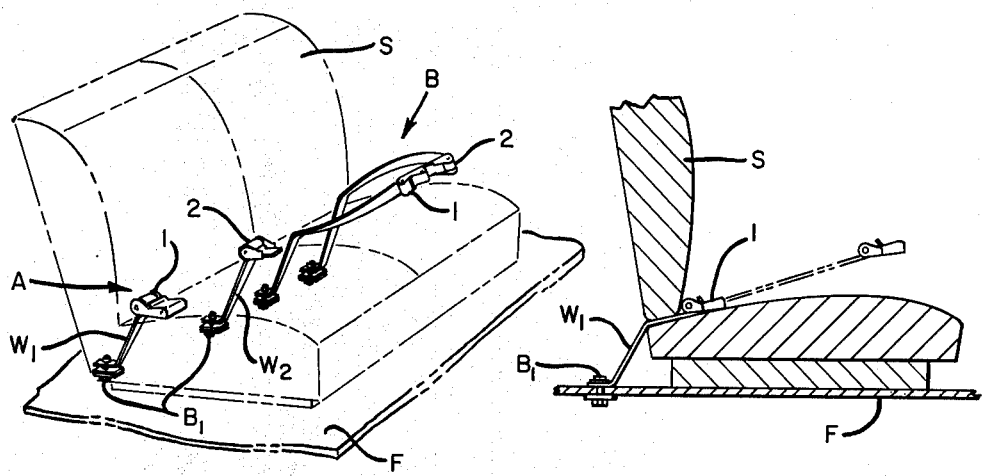
FIG-1  FIG-2
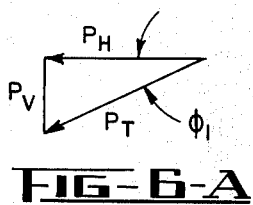
FIG-6-A
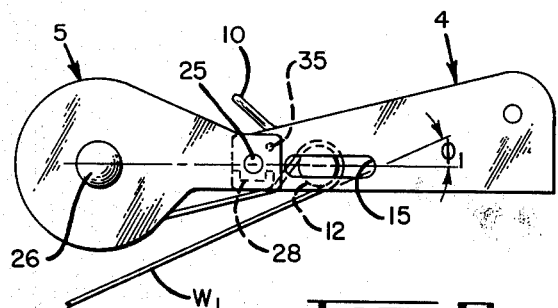
FIG-6
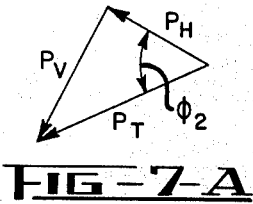
FIG-7-A
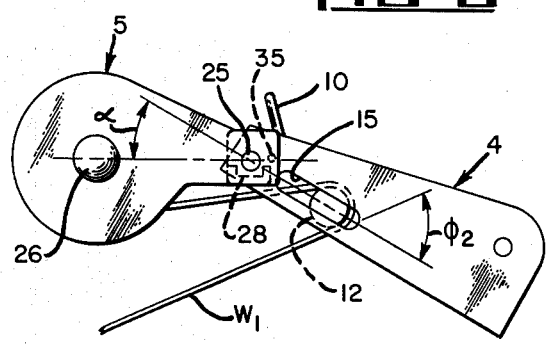
FIG-7
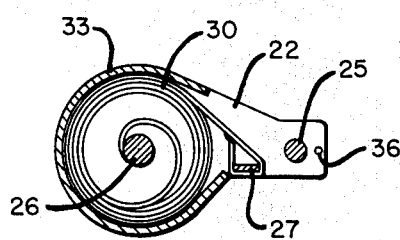
FIG-5
INVENTOR.
ROBERT A. STUBBLEFIELD
BY Yoshio Katayama
ATTORNEY Jan. 4, 1966 R. A. STUBBLEFIELD 3,227,489
RETRACTABLE SEAT BELT
Filed Aug. 21, 1963 3 Sheets-Sheet 2
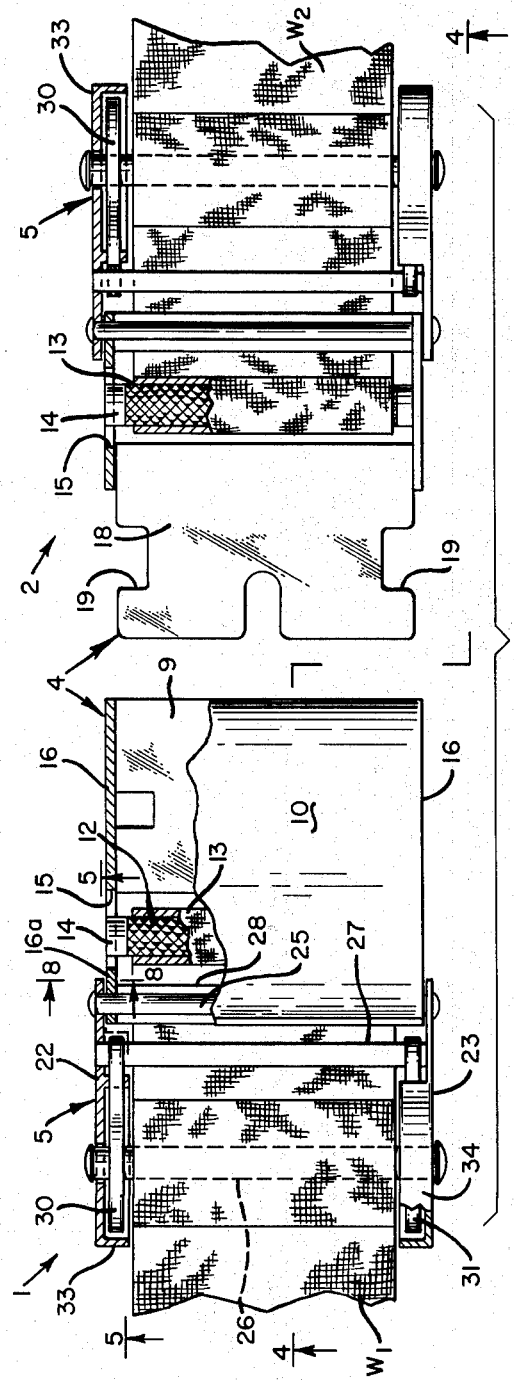
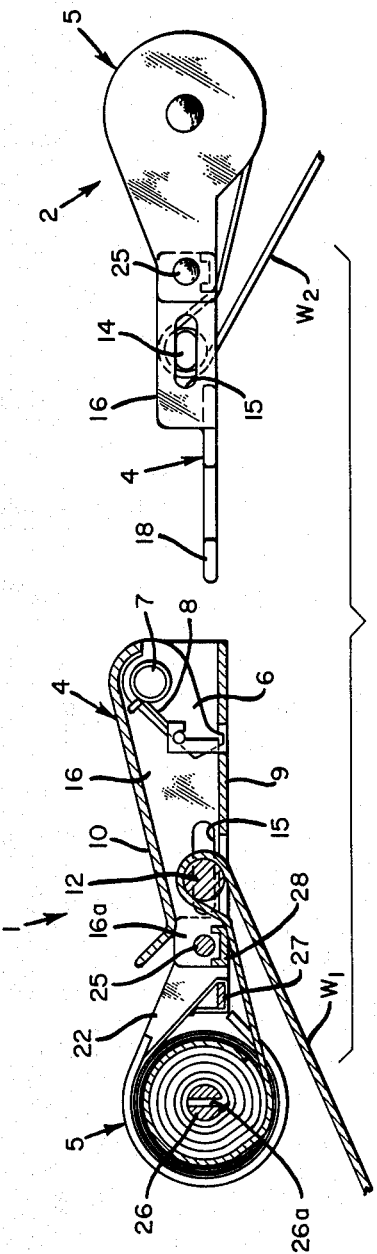
INVENTOR.
ROBERT A. STUBBLEFIELD
BY *Yoshio Katayama*
ATTORNEY Jan. 4, 1966 R. A. STUBBLEFIELD 3,227,489
RETRACTABLE SEAT BELT
Filed Aug. 21, 1963 3 Sheets-Sheet 3

INVENTOR.
ROBERT A. STUBBLEFIELD

BY *Yoshio Katayama*

ATTORNEY

United States Patent Office 3,227,489
Patented Jan. 4, 1966

3,227,489
RETRACTABLE SEAT BELT
Robert A. Stubblefield, 219 F St., Salt Lake City, Utah
Filed Aug. 21, 1963, Ser. No. 303,575
6 Claims. (Cl. 297—388)

This invention relates to safety belts, and more particularly to a retractable seat belt for use in passenger vehicles such as automobiles, airplanes and the like.

Each pair of conventional safety seat belts comprises two lengths of belt webbing anchored at laterally spaced points to the frame of the vehicle behind the seat and extending forwardly between the lower portion of the back cushion and the rear of the seat cushion. Interlockable quick-disconnect buckles are adjustably secured to the forward parts of the webbings at selected positions to provide an effective belt length to suit the comfort and proper fit of the particular passenger. When the belt halves are disconnected, they generally are tossed apart and come to rest in random positions to the rear or side of the seat cushion, or even on the floor. This usually necessitates the familiar hunt for the mating halves of the seat belt the next time a passenger seeks to secure himself in the seat. He often must rethread one or both belt halves between the back and seat cushions. Finally an annoying adjustment of one or both buckles may be necessary to lengthen or shorten the belt to fiit the passenger or driver. Not only do these shortcomings of present seat belts mean inconvenience and annoyance for users, but such deficiencies discourage use of belts that are installed.

An object of this invention is the provision of a seat belt which, when unbuckled, automatically assumes substantially the same position at the rear of the seat.

Another object is the provision of a seat belt which is readily and conveniently adjustable to the desired length for the safety and comfort of the user.

A further object is the provision of a seat belt construction which permits use of a variety of lightweight, soft, flexible high tensile strength materials for belt webbing.

Another object is the provision of a seat belt which, when not in use, is retracted out of the path of the driver or passengers who are moving into or out of the seat and yet is always conveniently accessible to the user.

Still another object is the provision of a safety seat belt which automatically symmetrically adjusts to the size and shape of the user so that the interlocked buckles may readily be positioned to the front.

A specific object is the provision of a two-piece hinged seat belt buckle which may be locked or unlocked to prevent or permit longitudinal movement relative to the webbing by simply pivoting one buckle piece relative to the other.

In accordance with my invention, the buckle of each seat belt pair comprises a reel on which a length of the belt webbing is wound, and a fastener hinged to the reel housing. The fastener is either male or female and is adapted to releasably interlock with the mating fastener on the other buckle of the belt pair. A spring connected between each reel and its housing applies a torque to the reel when the webbing is paid off the reel and causes the webbing to be rewound on the reel automatically when the buckle is released. In other words, the buckle is retractable along the webbing. When the seat belt is not in use, its two buckles are retracted to the junction of the back and seat cushions. The buckles are extended along the webbing to provide sufficient belt length for encompassing the user and to permit interlocking of the buckles in front of the user. Each buckle may be locked in its extended position on the webbing by pivotal movement of its fastener relative to the reel housing.

The foregoing and other objects of the invention will be better understood from the following description of a preferred embodiment thereof, reference being had to the accompanying drawings in which:

FIGURES 1 and 2 are perspective and side section views, respectively, of an automobile seat with seat belts embodying this invention and shown in extended and retracted positions;

FIGURE 3 is a plan view, partially broken away of the male and female seat belt buckles embodying the invention;

FIGURE 4 is a section taken on line 4—4 of FIGURE 3;

FIGURE 5 is a section taken on line 5—5 of FIGURE 3;

FIGURES 6 and 7 are side profiles of a seat buckle with its hinged parts shown in the locked and unlocked positions, respectively;

FIGURES 6A and 7A are vector diagrams illustrating the forces acting on a locking member of the buckle;

Figure 8:
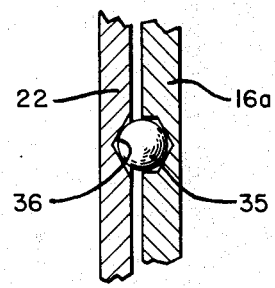
FIGURE 8 is an enlarged section taken on line 8—8 of FIGURE 3.
Figure 9:
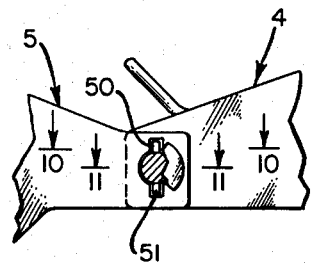
FIGURE 9 is a fragmentary side elevation of a modified pivot connection of the buckle parts.
Figure 11:
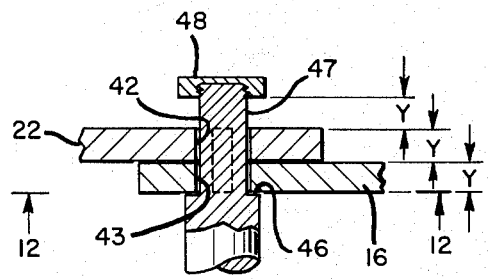
FIGURE 11 is an enlarged section of one side of the buckle pivot taken on line 11—11 of FIGURE 9.
Figure 10:
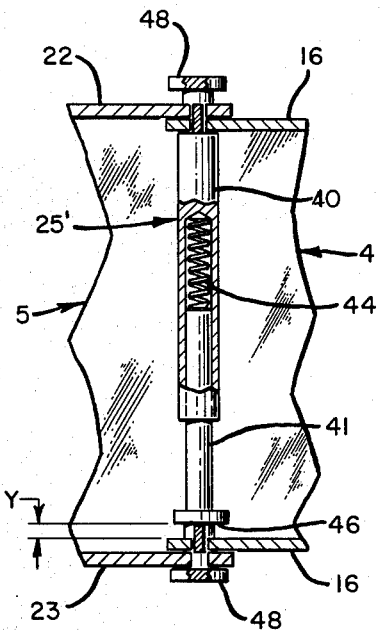
FIGURE 10 is a section taken on line 10—10 of FIGURE 9.
Figure 12:
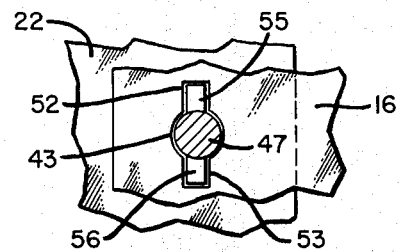
FIGURE 12 is a section taken on line 12—12 of FIGURE 11.
Figure 13:
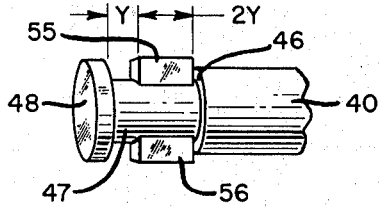
FIGURE 13 is a perspective view of the outer portion of one of the two parts of the pivot pin of FIGURE 10.

Referring now to the drawings, a preferred embodiment of the invention is shown in FIGURE 1 as two identical pairs A and B of seat belts disposed on the seat S of a vehicle such as an atuomobile. Each pair of belts comprises two lengths $W_1$ and $W_2$ of suitable webbing anchored to the floor F of the vehicle by bolts $B_1$ behind the seat and connected at their other ends to buckles 1 and 2, respectively. The buckles 1 and 2 of each belt pair releasably interlock with each other when the seat belt is fastened in the well-known manner. Each buckle is constructed as described below so as to store a substantial portion of the total length of the webbing to which it is connected and to permit all or part of the stored webbing to be paid out from the buckle when the latter is extended forwardly by the user to fasten the belt around him. The pair A of belts is shown with buckles disconnected and in the retracted position at the rear of the seat, and the pair B is illustrated in the extended or operative position with the buckles interlocked. FIGURE 2 also illustrates the buckle positions when retracted and extended (broken lines) relative to the seat.

Each of the buckles 1 and 2 comprises a lock section 4 at the forward end and a reel section 5 on which the belt webbing is wound. The lock section 4 of buckle 1 is of the well-known receptacle type having detents 6, one of which is shown in FIGURE 4, pivoted on transverse support pin 7 and urged downwardly by spring 8 against the buckle base plate 9. Release plate 10 connected to the detent 6 permits manual retraction of the detent for quick disconnect of the buckle. A cylindrical member 12 with a serrated surface 13 is non-rotatably supported by integral oval-shaped extensions 14 in elongated slots 15 in the rear of the section side walls 16. Member 12 is movable longitudinally in the side wall slots to prevent and permit relative movement between the buckle and belt webbing. The lock section 4 of buckle 2 comprises a projection plate 18 adapted to slide over receptacle base plate 9 and to cam detents 6 upwardly. Recesses 19 in the projection receive the detents for locking the buckle sections together.

In other respects the lock sections of the two buckles are substantially the same and like reference characters indicate like parts on the drawings. The lock sections per se do not constitute part of the invention except the manner in which each cooperates with the reel section to lock and release the buckle relative to the belt webbing as described below.

In accordance with the invention, a reel section 5 is pivotably connected to the rearward end of the lock section for storing a substantial portion of the length of the belt webbing. Since the reel sections 5 of buckles 1 and 2 are substantially identical, only the reel section of buckle 1 is described below, and like reference characters indicate like parts on the drawings.

The reel section comprises laterally spaced side frames 22 and 23 interconnected at the forward end by pivot pin 25, at the rear part by a reel axle 26, and at intermediate parts by spring anchor rod 27. The rear end portions 16a of lock section side walls 16 extend within the front ends of reel side frames 22 and 23 and are suitably mounted on pin 25 so that the entire lock section is capable of pivoting relative to the reel section about the axis of the pin. A U-shaped lock bar 28 is secured to and extends between the rear portions 16a of side walls 16 directly under pivot pin 27 and cooperates with cylindrical member 12 of the lock section to lock the buckle on webbing W when the reel and lock sections are in the relative position shown in FIGURES 4 and 6. This locking action is explained more fully below.

Reel axle 26 is longer than the webbing width and is journalled at opposite ends in frames 22 and 23 and is rotatable about its axis for winding a substantial portion of the length of webbing W thereon as shown in FIGURE 4. The central part of the axle is slotted at 26a to receive and secure the end of webbing $W_1$ thereto. Flat coil springs 30 and 31 are wound concentrically of opposite ends of axle 26 between the webbing $W_1$ and the side frames 22 and 23, respectively. The inner end of each spring is secured to the axle as shown in FIGURE 5 and the outer end is secured to rod 27. Cylindrical spring guards 33 and 34 formed integrally with frames 22 and 23, respectively, protectively cover the springs. The springs are tensioned by rotation of axle 26 in the direction of pay-out of webbing from the reel and apply a torque to the axle which tends to rewind the webbing on the reel. Thus, as the webbing $W_1$ on buckle 1 (see FIGURE 4) is unwound from the reel, axle 26 rotates in a counterclockwise direction, as viewed at the left in FIGURE 4, and the springs 30 (see FIGURE 5) and 31 wind onto the axle and become tensioned, thereby applying a torque to the axle. If the webbing is free to move over cylindrical member 12 and lock bar 28, and if the buckle is not otherwise restrained from moving relative to the webbing, the torque on axle 26 automatically rewinds the webbing thereon.

The lengths of belt webbing wound on axles 26 when springs 30 and 31 are not tensioned are selected so as to permit the user of the widest girth to be comfortably encircled by the pair of belts. In order that each buckle shell be in a convenient retracted position, preferably at the junction of the vertical and horizontal sections of the seat as shown in FIGURES 1 (seat belts A) and 2 (solid line), the length of the webbing between the untensioned reel and the floor anchor fitting B is selectively adjusted at the anchor. When the buckles of seat belt B in FIGURE 1 are released by the user, the reels of the buckles, in response to the torque of the coil springs, rewind the webbing and automatically retract the buckles to the positions shown for seat belt A. It should be noted that the reel section of each buckle, because of its size and shape, prevents the buckle from slipping between the seat and back cushions of the seat and therefore the buckle tends to assume the same accessible position on the seat when not in use.

In order to lock the buckle to the belt webbing in any extended position, and in order to provide relative articulate movement of the lock and reel sections and to provide relative planetary movement between the axle 26, the cylindrical member 12 and the lock bar 28, the pivotal connection of the lock and reel sections at pin 25 is provided. When these two buckle sections are positioned relative to each other so that the axes of cylindrical member 12 and pivot pin 25 and axle 26 are aligned in a common plane as shown in FIGURE 6, the webbing $W_1$ is wedged against lock bar 28 by member 12. This wedging action results from the sliding of member 12 toward the rear (to the left as viewed in FIGURE 6) of slots 15 due to the angle $46_1$ which the webbing makes with the slot axis which results in component $P_H$ (FIGURE 6A) of total force $P_T$ exerted by lower reach of webbing $W_1$ on member 12, the direction of component $P_H$ being parallel to the longitudinal axis of each slot 15. As member 12 is forced rearwardly, the webbing tightly frictionally engages bar 28 as well as the serrated surface 13 of member 12, and relative movement of the buckle and webbing is prevented.

In order to unlock the buckle from the webbing so that the buckle may move relative to the webbing, the lock section 4 of the buckle is pivoted about pin 25 relative to reel section 5 through an angle 25 (see FIGURE 7). This accomplishes two results: first, the portion of the webbing extending from member 12 to the webbing wound on axle 26 swings in a direction away from friction bar 28, thus substantially relieving the frictional bond between the webbing and bar 28. Also, the angle $46_2$ which the lower reach of webbing $W_1$ makes with the axes of slots 15 is increased, thereby reducing the component $P_H$ (see FIGURE 7A) of force tending to move the member 12 to the rear of the slots and permitting member 12 to be moved more readily to a forward position as shown in FIGURE 7. The spring loaded axle 26 is then able to rewind webbing thereon and return the buckle to its predetermined retracted position.

The extent of relative pivotal movement of the lock and reel sections of the buckle is limited by a hardened bearing ball 35 (see FIGURE 8) permanently secured to the interior of one or each of rear sidewall portions 16a of lock section 4. Balls 35 are adapted to project into cooperating grooves 36 in the adjacent forward parts of side frames 22 and 23. The grooves 36 are located at the desired limit or limits of pivotal movement of the buckle sections. When balls 30 are seated in the sockets, pivoting of the parts is arrested.

A modified form of pivot lock mechanism shown in FIGURES 9–13, inclusive, positively locks the reel section 5 and lock section 4 in position to clamp the belt webbing. The pivot pin 25' comprises a tubular element 40 and a post 41, each extending through openings 42 and 43 in the reel frame 22 or 23 and the lock section sidewall 16, respectively, on each side of the buckle. The inner end portion of post 41 telescopes within tubular element 40 and engages compression spring 44 seated within the element 40. Each of the outer ends of element 40 and post 41 are similarly constructed with a shoulder 46 engageable with the inner surface of side wall 16, a bearing portion 47 which extends through openings 42 and 43, and an enlarged button 48 threaded on the bearing portion and engageable with the outer surface of the reel side frame 22 or 23.

Diagonally opposite slots or keyways 50 and 51 (see FIGURE 9) are formed in each reel frame 22 or 23 outwardly from opening 42, and identical slots 52 and 53 formed in lock section side wall 16 are aligned with slots 50 and 51, respectively, when the lock section 4 and reel section 5 of the buckle are pivoted to relative positions corresponding to the web lock position of FIGURE 6. Each bearing portion 47 of the tubular element 40 and post 41 has secured thereto oppositely projecting keys 55 and 56 engageable in the keyway pairs 50, 52 and 51, 53, respectively. The length of each key preferably is no greater than the sum of the thicknesses of the juxtaposed reel frame 22 and the side wall 16. If the frame 22 and side wall 16 each have a thickness equal to Y, then the length of each key is 2Y or less. Also, the spacing between each key and the button 48 is no less than Y, and preferably slightly greater, in order to insure that the keys are completely displaced from slots 50 and 51 in frame 22 or 23 when the button is fully depressed against the frame.

Spring 44 tends to urge tubular element 40 and post 41 apart. When the buckle parts are positioned such that slots 50 and 51 in side wall 16 are aligned with slots 52 and 53, respectively, in the reel frame, shoulder 46 of the tubular element 40 or post 41 is urged against side wall 16 and the keys 55 and 56 extend through both sets of slots. In this condition, the parts are locked, and the button 48 extends out from the adjacent side frame as shown in the upper part, as viewed, in FIGURE 10 and in FIGURE 11. In order to unlock the pivot pin, both buttons 48 are depressed (as shown in lower part of FIGURE 10) simultaneously so that keys 55 and 56 are displaced from slots 50 and 51 in the reel side frames 22 and 23. The parts may then pivot about the axis of the pin 25' on bearing portions 47 to release the buckle for movement relative to the belt webbing. When the buckle parts are pivoted back to the locked position, spring 44 automatically causes the keys to be fully engaged with the aligned keyways, thus positively locking the parts in the web clamping position.

When the seat belt user, such as an automobile driver or passenger, initially takes his position on the seat, the buckles 1 and 2 of the seat belt are preferably unlocked and retracted to the rear of the seat on opposite sides of the user. In order to fasten the seat belts, the user grasps the buckles with his right and left hands, respectively, pulls both buckles around his waist and locks them together in a convenient location such as mid waist. The user then pivots the reel and lock sections of each buckle so as to tightly lock the buckle on the webbing and the seat belt is operative to secure the user safely in the seat. In order to remove the seat belt, the user pivots the buckle sections to the unblocked positions and lifts release plate 10 to disconnect the buckles which immediately return to their retracted positions.

Changes and modifications may be made to the above described embodiment of the invention without departing from the scope thereof. The invention is therefore as defined in the appended claims.

What is claimed is:

1. A retractable safety seat belt comprising belt webbing adapted to be anchored at one end to a vehicle, a buckle having detent means forming a lock section, a reel section, means pivotally connecting said sections for pivoting about an axis, said reel section having a frame, an axle supported on said reel frame for rotation about an axis parallel to said pivot axis, and coil spring means connected between said axle and frame and adapted to be tensioned when said axle is rotated in one angular direction, said belt webbing being connected at its other end to said axle and having a portion of its length wound thereon when said spring is substantially untensioned, and lock means associated with said reel and lock sections and operative upon relative pivotal movement of said sections for preventing and permitting relative movement between the webbing and the reel frame, said lock means comprising a fixed locking bar and a relatively longitudinally movable locking bar on said lock section engageable with said webbing and responsive to the angularity of said sections to lock or release said webbing.

2. A pair of retractable seat belts adapted to secure a passenger in a seat of a vehicle, each seat belt comprising, a length of belt webbing adapted to be anchored at one end thereof to said vehicle, a buckle comprising,
   a lock section adapted to interlock with a corresponding part of the mating buckle,
   a reel section having a frame pivotally connected to said lock section,
   an axle rotatably supported on said reel frame, and
   spring means connected between said axle and said frame whereby to become tensioned when said axle is rotated in one direction, said belt webbing being connected at its other end to said axle and having a portion of its length wound thereon when said spring is substantially untensioned, and
   means associated with said reel and lock sections for controlling relative movement between the webbing and the reel frame comprising,
      a pair of spaced parallel transverse members mounted for movement toward and away from each other on said lock section adjacent to the pivotal connection of said sections,
      said belt webbing passing between said members whereby relative pivotal movement of said sections in one direction causes one of said members to move toward the other and frictionally lock the webbing therebetween to restrict relative movement between said webbing and said reel frame and relative pivotal movement of the sections in the other direction releases said webbing for movement relative to said reel frame.

3. In a seat belt construction,
   a buckle part adapted to engage a mating connector,
   a first locking bar,
      said buckle part having means mounting said first locking bar for slidable longitudinal movement,
   a second locking bar fixed in said buckle part in cooperative adjacency to said movable locking bar,
   a reel frame part carrying a spring biased reel,
   and a belt having one end connected to said reel,
      said belt having its opposite end leading off of said reel, extending between said bars and over said movable locking bar and returning past said reel for anchoring attachment, said reel frame part having a pivot connection to said buckle part,
   whereby normal belt loading forces will dispose said reel frame part and said buckle part in a first position of longitudinal alignment so said belt will pull said movable locking bar towards said second locking bar to lock said belt,
   said reel frame part and said buckle part being pivotally movable into a second position of angular relation wherein said belt passes between said locking bars freely.

4. In a sea belt construction as defined in claim 3, releasable locking means for holding said reel frame and said buckle part in said first position.

5. In a seat belt construction according to claim 4, in which said releasable locking means comprises a pivot pin for pivotally connecting said parts and comprising two resiliently interconnected parts adapted to be moved relative to each other between two operating positions, at least one of said interconnected parts having a key, keyways in adjacent portions of said buckle part and reel frame part, respectively, adapted to be aligned with each other and with said key when said parts are pivoted to one limit of movement, said key being engageable in said keyways when said pin parts are in one operating position and being withdrawn from at least one of said keyways when said pin parts are in the other operating position.

6. A seat belt construction, comprising,
   a buckle part having detent means for mating attachment with another buckle part and including side walls on opposite sides thereof,
      each of said side walls having an elongated slot formed therein disposed to have substantial longitudinal extent, a stationary locking bar extending transversely between said side walls rearwardly of said slots, a movable locking bar extending transversely between said side walls and having means mounted in said slots for longitudinal sliding movement relative to said side walls, a reel frame part having side frames, a spring biased reel journalled in said side frames, said side frames having portions disposed adjacent the ends of said side walls, pivotal connection means between said parts, whereby said side frames and said side walls are movable between a first position in co-alignment to a second position in angular relationship, an a belt having one end connected to said reel and having its other end paying out over said movable locking bar so that said belt will be locked securely between said locking bars when said parts are in said first position and said belt will be freely movable between said locking bars when said parts are in said second position.

References Cited by the Examiner
UNITED STATES PATENTS

| | | | |
|---|---|---|---|
| 1,416,486 | 5/1922 | Macheroux | 24—1.4 |
| 1,622,954 | 3/1927 | Macheroux | 24—1.4 |
| 1,686,235 | 10/1928 | Heasley | 24—1.4 |
| 2,729,473 | 1/1956 | Warshawsky | 16—191 X |
| 2,822,595 | 2/1958 | Ruhl | 24—170 |
| 2,861,627 | 11/1958 | Smith | 297—388 |
| 2,896,284 | 7/1959 | Bishaf | 24—75 |
| 2,964,815 | 12/1960 | Sereno | 24—230.1 |
| 2,971,730 | 2/1961 | Martin | 244—122 |
| 3,020,089 | 2/1962 | Monroe | 297—388 |
| 3,100,669 | 8/1963 | Monroe | 297—388 |

FRANK B. SHERRY, *Primary Examiner.*